United States Patent
Mohammed et al.

(10) Patent No.: US 6,421,728 B1
(45) Date of Patent: Jul. 16, 2002

(54) ARCHITECTURE FOR COMMUNICATING WITH AND CONTROLLING SEPARATE UPSTREAM AND DOWNSTREAM DEVICES

(75) Inventors: Mannan Mohammed, Chandler; Howard M. Harte, Tempe; Tom Craver, Chandler, all of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/002,212

(22) Filed: Dec. 31, 1997

(51) Int. Cl.[7] .......................... G06F 15/17; H04N 7/173
(52) U.S. Cl. ....................................... 709/227; 725/111
(58) Field of Search ............................ 707/10; 345/326, 345/327, 335; 379/93; 709/201, 227, 203, 321, 324, 327, 221, 222; 348/6, 13; 713/1, 2, 100; 725/105, 106, 109, 110, 111, 114

(56) References Cited

U.S. PATENT DOCUMENTS

| | | | | |
|---|---|---|---|---|
| 5,003,384 A | * | 3/1991 | Durden et al. | 725/104 |
| 5,488,412 A | * | 1/1996 | Majeti et al. | 348/12 |
| 5,534,913 A | * | 7/1996 | Majeti et al. | 348/13 |
| 5,608,446 A | * | 3/1997 | Carr et al. | 348/13 |
| 5,675,800 A | * | 10/1997 | Fisher, Jr. et al. | 713/2 |
| 5,778,368 A | * | 7/1998 | Hogan et al. | 707/10 |
| 5,790,114 A | * | 8/1998 | Geaghan et al. | 345/326 |
| 5,809,252 A | | 9/1998 | Beighe et al. | 709/227 |
| 5,852,721 A | * | 12/1998 | Dillon et al. | 709/233 |
| 5,894,479 A | * | 4/1999 | Mohammed | 709/222 |
| 5,912,896 A | | 6/1999 | Beighe et al. | 370/463 |
| 5,923,736 A | * | 7/1999 | Scachar | 379/93 |
| 5,961,586 A | * | 10/1999 | Pedersen | 709/201 |
| 5,986,690 A | * | 11/1999 | Hendricks | 725/134 |
| 6,009,469 A | * | 12/1999 | Mattaway et al. | 709/227 |
| 6,041,356 A | * | 3/2000 | Mohammed | 709/227 |
| 6,081,533 A | * | 6/2000 | Laubach et al. | 725/132 |
| 6,157,965 A | | 12/2000 | Mohammed et al. | 710/8 |

* cited by examiner

*Primary Examiner*—Mark H. Rinehart
*Assistant Examiner*—Marc D. Thompson
(74) *Attorney, Agent, or Firm*—Blakely, Sokoloff, Taylor & Zafman LLP (57) ABSTRACT

Architecture for communicating with and controlling separate upstream and downstream devices. The architecture may be implemented as an apparatus comprising a client machine having a first device capable of receiving downstream data transmitted from a server to the client machine, and a second device capable of transmitting upstream data from the client machine to the server. The second device may have a smaller bandwidth than the first device. The apparatus also includes a control and parse engine capable of causing the first and second devices to establish a multi-homed connection with the server. When downstream data is received from the server via the first device, the control and parse engine selectively establishes upstream communication with the server via the second device.

23 Claims, 3 Drawing Sheets

ARCHITECTURE FOR COMMUNICATING WITH AND CONTROLLING SEPARATE UPSTREAM AND DOWNSTREAM DEVICES

BACKGROUND OF THE INVENTION

1. Field of the Invention

The present invention relates to the field of establishing computer networks for computers using separate upstream and downstream devices, such as one-way cable modems. Specifically, the present invention provides an architecture for communicating with and controlling separate upstream and downstream devices.

2. Description of Related Art

Currently, most home personal computers (clients) are connecting with the Internet and other on-line services using the public telephone network. Most often, data is transferred using Transmission Control Protocol/Internet Protocol (TCP/IP) implemented over such protocols as the Point-to-Point Protocol (PPP) or the Serial Line Internet protocol (SLIP). PPP and SLIP allow clients to become part of a TCP/IP network (such as the internet) using the public telephone network and either an analog modem or an Integrated Services Digital Network (ISDN) device. Clients connect to a network by "dialing-up" a Point of Presence (POP), or "headend", server, which then assigns the client an IP address.

The public telephone network has a switched point-to-point architecture and only offers relatively low bandwidth as it was originally designed for analog voice communication. Thus, it does not scale well to the delivery of broadband data such as multimedia. As a result, there are several efforts to create a broadband data delivery infrastructure for client applications. Such an infrastructure, when combined with the increasingly powerful clients that are now available, will enable the delivery of rich multimedia programming to the home.

Broadband data delivery may be accomplished over a variety of different delivery infrastructures. Of these, perhaps the most promising is the infrastructure currently used to deliver cable television. Recent advancements in radio frequency modulation and demodulation technology, along with a large base of cable television subscribers, has made cable television service providers a strong candidate for becoming the preferred provider of broadband services to the home. In the broadband network architecture, a client will be continuously connected to the broadband network and will be in communication with one or more headend servers at all times.

However, as the cable television network was originally intended only for transmitting data from a headend server located at the cable television service provider's site to one or more subscribers/users (i.e., the network was designed for a one-to-many transmission of information), no provision was made for receiving data from the equipment (i.e., clients) located at the users' locations. Thus, the broadband network architecture only provides for the delivery, and not the receipt, of data]. Moreover, although certain broadband networks are becoming equiped with the capability of two way communications, in broadband networks without this capability, no data can be sent back from client to the headend.

A solution has been proposed to achieve two-way communication of data using the existing cable television infrastructure. "Downstream data", defined to be data sent from a headend server to a client, is transferred over coaxial cable from the headend server into the home and to the user's client PC, while "upstream data", defined to be data sent from the client to the headend server, is transferred over the public telephone network. The asymmetrical allocation of upstream/downstream bandwidth is acceptable for most applications as the majority of users requires a larger downstream bandwidth compared to the upstream bandwidth (i.e., most users are "data consumers" rather than "data generators").

In operation, downstream data is received by a client using a "one-way" cable modem while upstream data is transmitted by an analog modem or an ISDN device, over the public telephone network, to the headend server via a Plain Old Telephone Service (POTS) server at the headend office. The POTS server forwards any upstream data sent by the client to the headend server for appropriate action (e.g., providing domain name server (DNS) services, simple mail transfer protocol (SMTP) services, gateway or proxy services, etc.). Without the public telephone network, there is no upstream data path as the client cannot transmit any information to the headend server through the cable modem.

The client and the headend server communicate using TCP/IP. Data is transmitted in packets, where packets are defined as a block of data with appropriate transmission data attached in the form of a header and footer to be sent or received over a network. Downstream and upstream data are sent using the Ethernet standard, as defined by the Institute of Electrical and Electronics Engineers (IEEE) 802.3, modulated for transmission over: (1) coaxial cable using the cable modem; or, (2) a telephone line using the analog modem or the ISDN device and PPP or SLIP protocols.

In order for the client to use the cable modem for communication, the cable modem is installed as an Ethernet adapter in the client, and the client is configured as a TCP/IP network machine. All network traffic appears as digital Ethernet data to the client. However, the data received by the cable modem is transmitted over a coaxial cable network using the analog quadrature amplitute modulation with 6 bit encoding (QAM64) techniques. The QAM64 modulated data transmitted by the headend server is demodulated to digital Ethernet data by the radio frequency (R/F) circuitry of the cable modem.

The upstream and downstream data sent and received by the client over the separate devices are to be treated as a single communications session. However, current operating systems do not provide for the necessary control and communication interfaces needed for both the upstream network device and the downstream network device. Present operating systems are geared towards controlling network devices that provide both upstream and downstream traffic.

Therefore, an architecture needs to be provided for the above-identified situation where a client PC has separate upstream and downstream device such that the operating system of the client PC can interface with the separate devices. It would also be desirable for this architecture to support different upstream and downstream devices based on technologies other than analog modems, digital adapters, and cable modems. For example, the architecture should be usable with satellite receivers as the one-way data device.

SUMMARY OF THE INVENTION

What is disclosed is an apparatus having a first interface with a device driver for interfacing with an downstream device; and, a second interface having a control and parse engine and an input/output control interface for interfacing with the first interface.

DETAILED DESCRIPTION OF THE INVENTION

The present invention provides an architecture for interfacing with separate upstream and downstream devices. For purposes of explanation, specific embodiments are set forth to provide a thorough understanding of the present invention. However, it will be understood by one skilled in the art, from reading this disclosure, that the invention may be practiced without these details. Further, although the present invention is described with a one-way asymmetric cable modem network, most, if not all, aspects of the invention apply to all networks in general. Moreover, well-known elements, devices, process steps, and the like are not set forth in detail in order to avoid obscuring the present invention.

The proposed system architecture is used for computer systems communicating in networks such as one way cable modem networks that use analog modems or ISDN adapters for upstream transmissions and cable modems for downstream transmissions. The system architecture includes components for different upstream and downstream devices. The target operating systems are Microsoft® Corporation's Windows 95® and Windows NT® operating systems.

The system components used by the cable modem includes a device driver, an application to interface and control the driver, and an animated user interface to reflect the traffic activity and control the service daemon. A transport layer driver is also used to interface with the device driver for operating systems which do not allow applications to directly communicate with device drivers. After the initial configuration and initialization of the cable modem, data would come from the headend server over the coaxial cable in the cable network. The application is also used to interface and control the device driver for the analog modem. In order to control the R/F circuitry contained in the cable modem, a Cable Services Library (CSL) is used in the cable modem device driver. Various input/output control (IOCTL) entry points into the cable modem driver, provided by data structures such as object attribute identifiers (OID), are also provided which allow the application to interact and set the cable modem driver parameters. The application can communicate with the driver and provide real-time user feedback with animated icons to reflect traffic activity or can set various hardware parameters using the OID interface.

Figure 1:
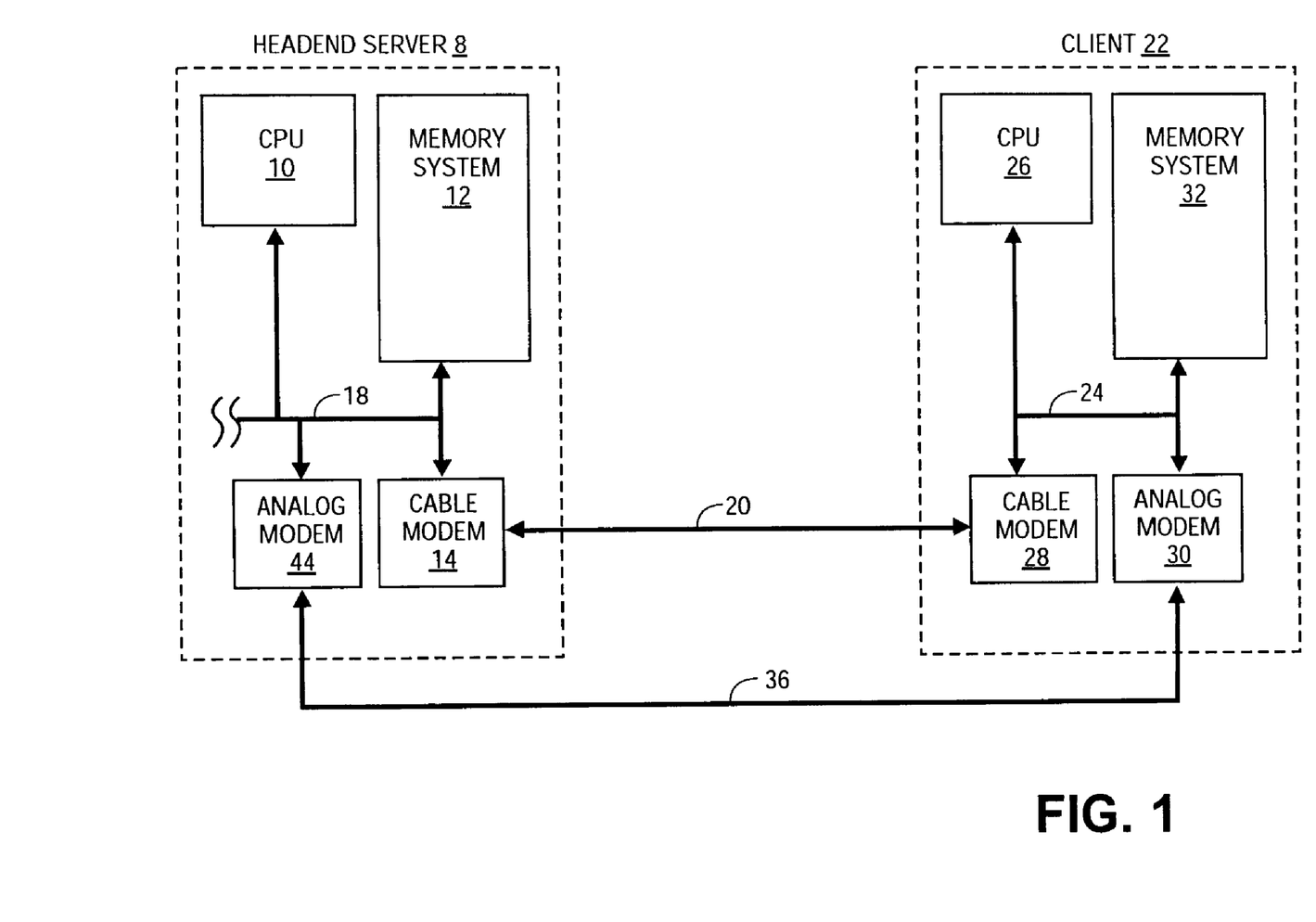
FIG. 1 is a block diagram of a computer network with a client and a server configured in accordance with one embodiment of the present invention.

FIG. 1 is a block diagram of a system configured in accordance with a preferred embodiment of the present invention. In FIG. 1, headend server 8 has a CPU 10, a memory system 12, a cable modem 14 and an analog modem 44 communicating with each other over bus 18. Headend server 8 provides high-speed data services and can offer access to the internet and proprietary networks through the use of special interfaces (not shown).

Also in FIG. 1 is a client 22 which includes a bus 24 to which a CPU 26, a cable modem 28 and an analog modem 30 are connected. A memory system 32 is also connected to bus 24. Memory system 32 may be solely random access memory or a combination of random access memory and other, non-volatile, data storage units such as read-only memory or magnetic disk media. Memory system 32 has a client daemon 34 stored in it which cooperate with CPU 26 to provide the desired results. Client 22 is coupled to and communicates with headend server 8 through the use of cable 20.

Client 22 is connected and sends data to headend server 8 through the use of analog modem 30 and a telephone line 36. Headend server 8 receives data from client 22 using analog modem 44. As explained below, headend server 8 communicates with client 22 using a communication protocol such as the Transmission Control Protocol/Internet Protocol (TCP/IP). This protocol allows the performance of a large number of functions including packetizing data by attaching a header and footer to a block of data to be transmitted over a network and setting up a two-way connection between headend server 8 and client 22. Thus, both headend server 8 and client 22 are configured as ordinary TCP/IP network machines.

In operation, data packets are assembled by headend server 8 and sent to cable modem 14, which transmits the data packets to client 22 on cable 20. Cable modem 14 includes an Ethernet adapter which supports the Ethernet standard as defined by the Institute of Electrical and Electronics Engineers (IEEE) 802.3. In addition, cable modem 14 is responsible for transmitting Ethernet packets over cable 20. Some packets are intended to be received by all clients while other packets are targeted for one or more specific clients.

It is to be noted that the functions performed by headend server 8 to transmit and receive the data over cable 20 and telephone line 36 can be divided between one or more servers. For example, a separate server can be used only to handle the communication of data over telephone line 36 while leaving headend server 8 to handle only the communication of data over cable 20.

Memory system 32 of client 22 has various software elements stored in it that cooperate with CPU 26 to provide desired results. These software elements, shown in FIG. 2, include an operating system. As detailed below, in one embodiment, the operating system includes a transport stack layer. The transport stack layer includes a TCP/IP layer and a network driver interface layer. In other embodiments, these layers can be added onto the operating system. Layers are logical divisions in a computer system among its hardware and software functional components.

Figure 2:
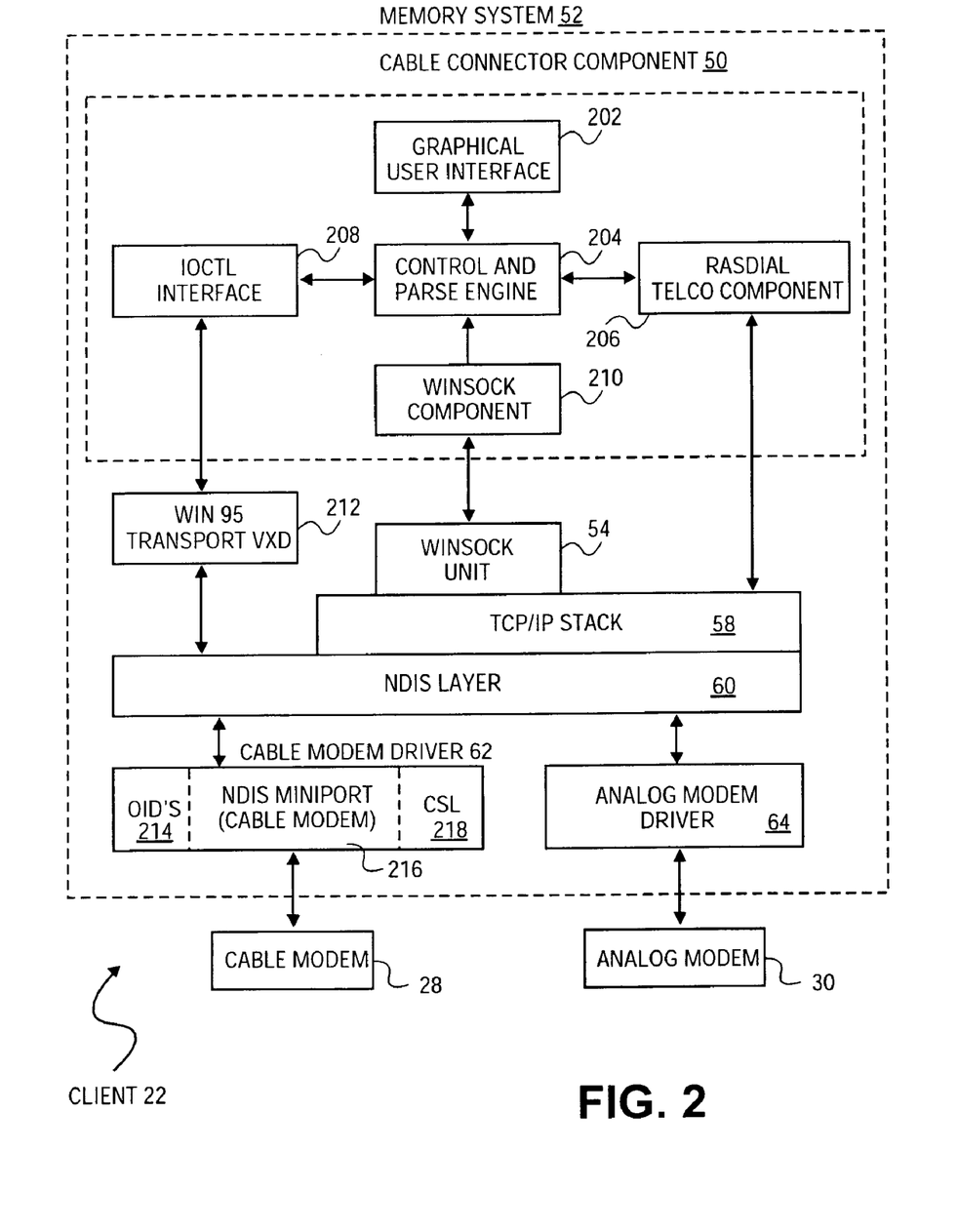
FIG. 2 is a block diagram of a memory system of the client configured in accordance with one embodiment of the present invention.

The TCP/IP layer enables client 22 to receive and send data on a TCP/IP network, such as the Internet. The TCP/IP layer surrounds data passed from upper layers in client 22 with header information before sending the data to other layers in the communication subsystem of client 22.

The network driver interface layer provides communication between the transport layer and a network driver (also referred to as a device driver). Examples of network driver interface layers include the Open Data-Link Interface (ODI) layer from Novell®, Incorporated, and the Network Driver Interface Specification (NDIS) layer from Microsoft® Corporation.

In one embodiment, the operating system is Windows 95® or Windows NT® from Microsoft® Corporation. Both of these operating systems include a transport stack which includes a TCP/IP layer and an NDIS layer. Further information about the NDIS layer is disclosed, for example, in a CD-ROM from Microsoft® Corporation entitled *Microsoft® Developer's Network Library* (1996), incorporated herein by reference, and in Dhawan, Sanjay, *Networking Device Drivers*, ch. 5, pp. 197–231, Van Noscrand Reinhold (1995), also incorporated herein by reference.

Device drivers that interface with an NDIS layer are referred to as "miniport" drivers. Miniport drivers are positioned between the NDIS layer and devices such as a network controller or an analog modem to provide control and data interfaces to the system. Device drivers are typically suited only for a particular device, although generic device drivers are available for particular categories of devices.

Other software elements stored within client 22 include application programs and, in one embodiment of the present invention, interface software that includes routines to control the function of a cable modem interface unit. The interface software, when used with an NDIS layer, is implemented as a miniport driver.

In the preferred embodiment, cable modem 28 is installed as an internal card which interfaces to bus 24 of client 22. For example, bus 24 can be a bus which conforms to the Peripheral Component Interconnect (PCI) standard and cable modem 28 can be contained on a card which would interface with PCI busses. Similar to cable modem 14, cable modem 28 includes an Ethernet adapter which supports the Ethernet standard as defined by IEEE 802.3. Cable modem 28 is also responsible for transmitting the Ethernet packets from client 22 to headend server 8 over cable 20.

Thus, after the initial configuration and initialization of cable modem 14, downstream data would come to client 22 from headend server 8 over cable 20. However, in order for client 22 to send data back to headend server 8, an upstream connection would need to be initiated with headend server 8. Once the connection is established, the TCP/IP stack contained on client 22 becomes multi-homed (i.e. client 22 would have two IP addresses—one for analog modem 30 and one for cable modem 28), and any data that need to go upstream (i.e. to headend server 8) would go over telephone line 36 while any data that needs to come downstream is still transmitted over cable 20.

FIG. 2 illustrates the content of memory system 32 of client 22 containing a cable connector component 50, a winsock unit 54, a TCP/IP stack 58, a network driver interface specification (NDIS) layer 6, a cable modem driver 62, and an analog modem driver 64. Memory system 32 of client 22 also contains other system software components that are used in the operation of client 22, but are not shown in FIG. 2.

In one embodiment of the present invention, cable connector component 50 is an application program run by client 22 during system initialization to allow client 22 to communicate with cable modem 28 and analog modem 30 through the cable modem driver 62 and analog modem driver 64, respectively. Cable connector component 50 contains a graphical user interface 202, a control and parse engine 204, a RASDial telco component 206, an input/output control (IOCTL) interface 208, and a winsock component 210.

Control and parse engine 204 of cable connector component 50 controls the operations of the other modules of cable connector component 50. For example, control and parse engine 204 controls both the establishment of connectivity and the responding to poll/command messages from headend server 8. Information received from headend server 8 by winsock component 210 is passed on to control and parse engine 204 to be parsed and then used to perform various operations. Control and parse engine 204 connects and disconnect the telephone/ISDN upstream connection using RasDial telco component 206, as described below. Control and parse engine 204 interacts with cable modem driver 62 using IOCTL interface 208. Also, when cable connector component 50 is initially invoked, control and parse engine 204 will access the Registry to obtain default values for the parameters. A complete listing of all parameters required will be defined later.

Graphical user interface 202 provides both the control and the information interface for a user of client 22. In one embodiment, graphical user interface 202 takes the form of an animated Windows 95® tray icon which rotates to indicate network traffic and displays different colors to indicate the status of the connection between client 22 and headend server 8 over cable 20. Cable modem driver 62 notifies the intermediate transport driver, win95 transport VxD 212, which in turn notifies graphical user interface 202 when certain events occur. As a result, graphical user interface 202 changes its state and reflects the changes in the tray icon by either changing colors or rotating. Control and parse engine 204 communicates with graphical user interface 202 by sending user datagram protocols UDP datagrams across the winsock interface.

RASDial telco component 206 provides the analog telephone/ISDN connection capability by using the Microsoft® remote access services (RAS) application programming interface (API) to enable control and parse engine 204 to start a RAS connection operation, get information about existing RAS connections, and end a RAS connection. RASDial telco component 206 is used to establish the RAS connection between control and parse engine 204 (a RAS client) and headend server 8 (a RAS server or terminal server). The connection established creates a multi-homed stack effect in TCP/IP stack 58, which allows the stacks to receive data over one interface (cable modem) and transmit over another (analog phone/ISDN). Cable modem driver 62 also has autodialing capability that causes RASDial telco component 206 to set-up a connection every time an upstream data packet is generated by an application when the upstream connection is not present. The autodialing feature is disclosed in a co-pending application by Mannan Mohammed, one of the named inventors, titled Method and Apparatus for Detecting Network Traffic and Initiating a Dial-Up Connection, U.S. patent application Ser. No. 08/829,584, filed on Mar. 31, 1997, and is incorporated by reference herein.

Input/output control (IOCTL) interface 208 provides a direct interface to cable modem driver 62 via DeviceIOControl calls, during which IOCTL interface 208 first opens a connection to cable modem driver 62 using the "CreateFile" API call. The CreateFile API returns a handle (i.e., pointer) that is used in all future interactions. The IOCTL calls use predefined object attribute identifiers (OID's), which are predefined data structures containing command and data information, to pass parameters between control and parse engine 204 cable modem driver 62.

Control and parse engine 204 connects to the standard transport stacks using a standard UDP socket provided by winsock component 210. This socket will bind to a known port, in one embodiment, port #473, and stays in a "listen" state, waiting for any data to be forwarded to the known port. In one embodiment, this socket connection is planned to be used for one-way downstream traffic, and is a mechanism for control and parse engine 204 to receive the control and polling messages from headend server 8. The socket connection should be non-blocking (i.e., control comes back immediately to the application and the application can continue to receive packets while the application is processing other packets), and implement callback routines (i.e., a sub-routine that is executed when an external event occurs), to notify cable connector component 50 of received data.

Winsock unit 54 is used as an interface to TCP/IP stack 58, and provides an application program interface (API) for application programs such as application 50 to access TCP/IP stack 58. Winsock unit 54 also contains a listing of the port numbers that are being used cable connector component 50 and other applications and the sockets which are bound to those port numbers.

As discussed above, TCP/IP stack 58 performs the functions required when communicating with a TCP/IP network such as the Internet. NDIS layer 60 provides the interface between the network protocol and the network driver. In one embodiment of the present invention, when Windows 95® or Windows NT® are used as the operating system of client 22, TCP/IP stack 58 and NDIS layer 60 are included with the operating system.

In addition to having separate devices for upstream and downstream data transfers, a client will be said to be "multi-homed" in that the client's upstream device and its downstream device will both have different IP addresses as the upstream device (i.e., the analog modem or ISDN device), will be assigned an IP address in addition to the IP address already assigned to the cable modem. In the multi-homed environment, all upstream data will be sent to the IP address of the upstream device while all downstream data will be received from the IP address of the downstream device.

Before multi-homing of the client's TCP/IP stack takes place, all packets (data frames) being sent by the client will be delivered to the downstream device (i.e., the cable modem) for transmission to the headend server. However, as the cable modem does not support transmission of upstream data, the cable modem cannot transmit the packets, and as a result, the packets are lost. After multi-homing of the client's TCP/IP stack takes place, upstream data will be sent using the upstream device (i.e., the analog modem on ISDN device) while downstream data will still be received over the cable modem.

In order for the client to become multi-homed and capable of sending data back to the headend server, a user either (1) manually "dials-up" (i.e., the user initiates a connection to) the headend server using functions such as those provided by the Remote Access Services (RAS) library provided by Microsoft® Corporation in its Windows NT® and Windows 95® operating systems; or (2) launches an application that causes the system to automatically dial-up the headend server. Once the connection is established, the TCP/IP stack becomes multi-homed and any data that needs to go upstream would go over the public telephone network while any data that needs to come downstream still comes over the coaxial cable.

Analog modem driver 64 is the software controller for analog modem 30 and provides access to the functions provided by analog modem 30. Thus, analog modem driver 64 is used to communicate with analog modem 30, which in turn is used to communicate with analog modem 44 of headend server 8. In one embodiment, analog modem 30 and analog modem 44 are standard modems configured to work with the public switch telephone network. In an alternate embodiment, adapters transmitting signals using digital technologies such as ISDN can be used. It is also to be noted that any network/medium can be used to provide the upstream connection from client 22 to headend server 8, in addition to analog modems or ISDN adapters. Thus, even adapters which use wireless communications technology can also be used.

Cable modem driver 62 is the software controller for cable modem 28 and provides access to the functions provided by cable modem 28. In one embodiment of the present invention, cable modem driver 62 is a NDIS Miniport driver written to the Microsoft® Corporation's NDIS 3.1 specification that allows drivers to be binary compatible with Windows 95® as well as Windows NT®. Cable modem driver 62 contains an object attribute identifier (OID) module 214 and a cable services library (CSL) 218 in addition to a NDIS miniport module 216.

CSL module 218 provides the cable modem specific API's for manipulating the R/F analog hardware components of cable modem 28. CSL module 218 contains routines that perform functions such as setting the upstream/downstream frequency and R/F circuit power levels of cable modem 28. CSL module 218 also provides API's for checking the status of cable modem 28. A list of the API's provided by CSL module 218 is contained in Appendix B As described below, the API's contained in CSL module 218 is accessed by applications through the OID's in OID module 214.

OID module 214 provides an interface for applications to interrogate and set the hardware parameters of cable modem driver 62. Applications will use DeviceIOControl (IOCTL) calls to communicate with cable modem driver 62. The IOCTL calls use OID's to identify all prior art API's, in addition to the custom API's, such as those contained in CSL module 218, which will be required by applications such as cable connector component 50 to manipulate cable modem 28. As described above, OID's are predefined data structures containing command and data information used to call specific routines in cable modem driver 62. For example, the OID to call the function SetDownstreamFrequency( ) in one embodiment is the value "0xFF010154." Cable modem driver 62 provides support for all OID's needed to interface with cable modem 28. A complete list of OID's is provided in Appendix A.

Cable modem driver 62 and analog modem driver 64 are specific to cable modem 28 and analog modem 30, respectively. They are used to initialize, configure and control cable modem 28 and analog modem 30, respectively, and are loaded at system boot time. In alternate embodiments, the functions of cable modem driver 62 and analog modem driver 64 can be implemented by one module or more than one modules.

RASDial telco component 206 and analog modem driver 64, are used to initiate an upstream connection with headend server 8. RASDial telco component 206 is a daemon application which is resident in memory system 32 and performs the functions necessary to cause analog modem 30 to dial-up headend server 8. In one embodiment, RASDial telco component 206 uses the RASDIAL API library under Windows 95® to initiate a dial-up connection.

When a packet is received by client 22 using cable modem 28, it is passed on to cable modem driver 62. Cable modem driver 62 in turn transfers the packet onto TCP/IP stack 58. In TCP/IP stack 58, the packet is checked for errors, stripped of its header and footer and passed on to cable connector component 50.

Conversely, where the data is generated by cable connector component 50, the data is sent to analog modem driver 64 for transmission by analog modem 30 to analog modem 44. Thus, cable connector component 50 would generate a packet which would be sent to TCP/IP stack 58, which would place the proper header and footer on the packet before sending it to analog modem driver 64.

It is to be noted that before an upstream path is established, and before TCP/IP stack 58 becomes multi-homed, cable modem driver 62 is sent any upstream packets. In prior art systems, the cable modem would just discard the upstream traffic. However, as disclosed above, cable modem driver 62 contains the capability to initiate the establishment of an upstream connection through the use of cable connector component 50 when cable modem driver 62 receives any upstream packets.

Also, other applications programs can generate the upstream traffic that is sent to TCP/IP stack 58. An example of an application program is an Internet Web browser that is used to view data received from the Internet and initiate requests of data from the Internet. Thus other application programs can also cause cable modem driver 62 to initiate an upstream connection.

FIG. 2 also contains a Win 95 transport VxD 212 that is used in operating systems like Windows 95®, where an application cannot directly interact with a device driver (e.g., cable modem driver 62). Win95 transport VxD 212 is a transport level driver that communicates with NDIS layer 60 and allows IOCTL interface 208 of cable connector component 50 to communicate with cable modem driver 62 in operating systems such as Windows 95®. Win95 transport VxD 212 is not needed in operating systems, such as Windows NT®, that allow an application to directly interact with a device driver.

Figure 3:
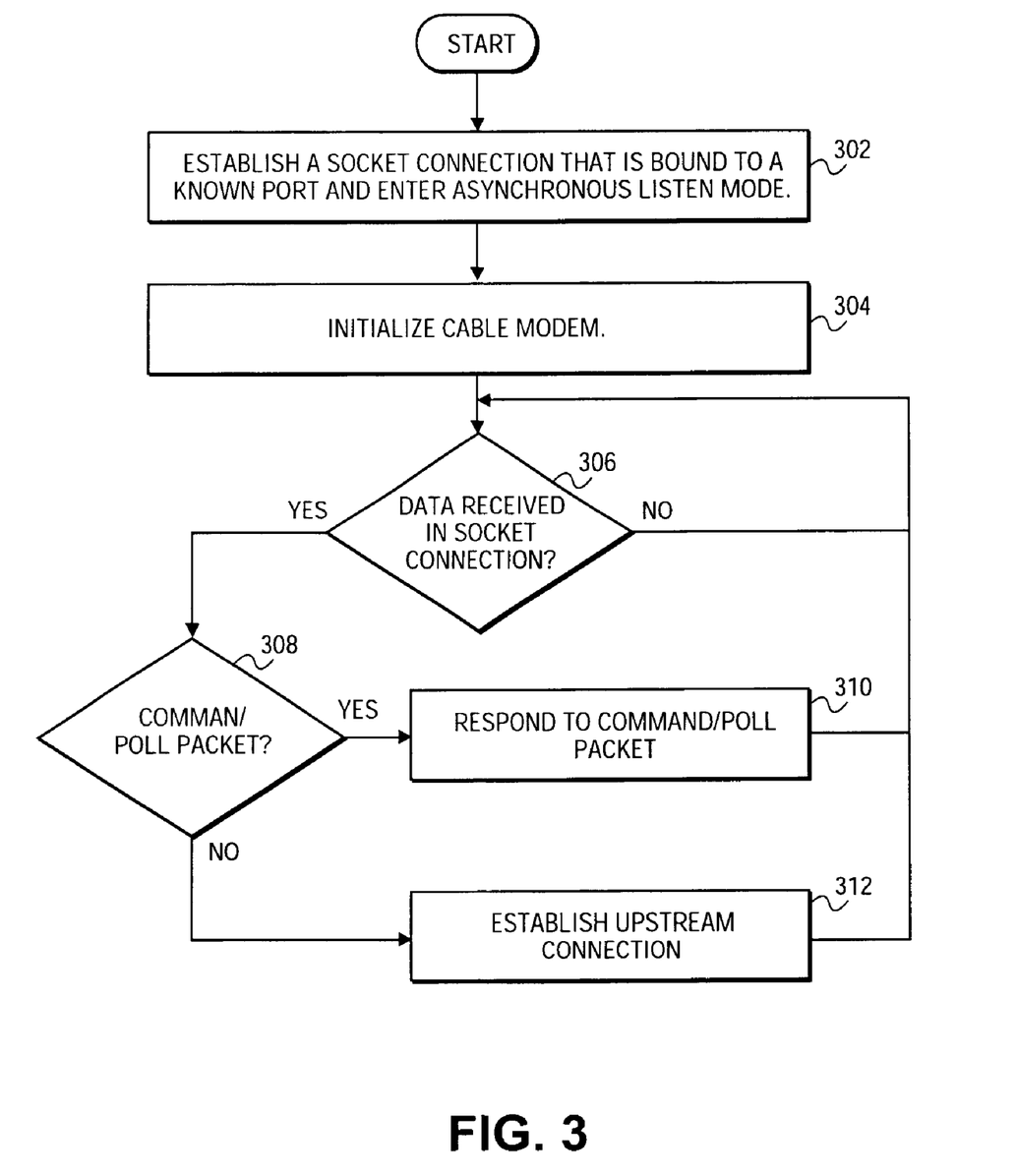
FIG. 3 is a flow diagram of the operation of the architecture contained in the memory system of the client in the computer network for interfacing with separate upstream and downstream devices in accordance with one embodiment of the present invention.

FIG. 3 is a flow diagram of the operation of the architecture contained in memory system 32 of client 22. The operation of cable connector component 50 begins when cable connector component 50 is initiated, either by a user or by the operating system.

In step 302, cable connector component 50 establishs a socket connection in winsock unit 54. In one embodiment. The socket connection will be bound to port number 473 so that all data sent to that port number is forwarded to cable connector component 50. After the socket connection is established, cable connector component 50 enters an idle mode and waits for data to be received on that port.

In step 304, cable modem 28 is initialized to receive data from headend server 8. In one embodiment, headend server 8 constantly broadcasts data and commands to cable modem 28. Thus, cable modem 28 needs to be configured to the correct broadcast frequency whenever client 22 is operational. Cable modem 28 is configured by either the user or the system at the booting of the client 22. When the user configures the system, the user issues a configuration command at graphical user interface 202. This configuration command is translated into an OID and delivered to cable modem driver 62 through IOCTL interface 208 (win95 transport VxD 212 is optionally used for operating systems such as Windows 95®, as discussed above). The initialization command will tune cable modem 28 to a frequency where it can start receiving packets. When cable modem 28 is configured at boot time, the OID will be issued by the system and cable modem driver 62 uses known valid defaults from a non-volatile source such as the Registry of the operating system to tune cable modem 28. In one embodiment, user intervention to configure the system would be required only when the default tuning by cable modem driver 62 fails.

In step 306, after the system is configured, cable connector component 50 is idle until data is received on the port established in step 302. Any data received by the socket is passed to control and parse engine 204. Control and parse engine 204 interprets the information contained in the received packets and takes the appropriate action according to the discussion below.

In step 308, the received data is parsed by the control and parse engine 204 to determine if a command or poll packet is received from either headend server 8 or the user. If a command or poll packet is received, operation will continue with step 310. Otherwise, operation will continue with step 312.

In step 310, a command or poll packet is received by cable connector component 50. Any request to change to the configuration of cable modem 28 (e.g., changing power levels or tuning to different frequency), is responded to by control and parse engine 204. Control and parse engine 204 uses IOCTL interface 208 to communicate with cable modem driver 62 by sending appropriate OID's. If an acknowledgment to the command or poll packet is required to be sent, control and parse engine 204 generates the acknowledgment. If the user issues commands to either query or change the parameters of cable modem driver 62 or cable modem 28, control and parse engine 204 parses the commands and uses IOCTL interface 208 to communicate with cable modem driver 62. Once a reply is returned by cable modem driver 62, cable connector component 50 displays the information back to the user through the use of graphical user interface 202.

In step 312, if control and parse engine 204 determines that the received data does not contain a command or poll packet, then, in one embodiment of the invention, control and parse engine 204 assumes that the received data contains upstream data that is received because the upstream connection and multi-homing have not been configured. Thus, cable connector component 50 will establish an upstream (RAS) connection. To establish a RAS connection, the dial-up phone number of headed server 8 is obtained by control and parse engine 204 from either the Registry, or a dial-up packet that is frequently broadcasted by headend server 8 and is received by control and parse engine 204 on the socket connection.

Using the username and password supplied by the user or obtained from the Registry, control and parse engine 204 establishes a RAS connection with headend server 8. After the connection is established, the upstream traffic will be sent out over the RAS connection due to the multi-homed nature of the transport stacks (i.e., TCP/IP stack 58). Downstream traffic is still received by cable modem 28 and is passed up to the transport stacks (i.e., TCP/IP stack 58), using NDIS layer 60.

It is to be noted that the present invention can be used in other systems with separate upstream and downstream devices. For example the present invention can be used where the downstream device is a satellite modem.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

APPENDIX A

OID Definitions

```
#define FLINT_SPECIFIC_OID_MASK        0xFF000000
#define FLINT_SET_OID_MASK             0xFF010000
#define FLINT_GET_OID_MASK             0xFF020000
/* --------------------------------------------------
The 0xFF0101XX OIDs define the operational oids where
some parameters of the hardware are set.
-----------------------------------------------------*/
#define OID_FLINT_INIT_ALL             0xFF010101
#define OID_FLINT_INIT_DEMOD           0xFF010102
#define OID_FLINT_INIT_UP              0xFF010103
#define OID_FLINT_INIT_RF              0xFF010104
#define OID_FLINT_SET_TUNER_FREQ       0xFF010105
#define OID_FLINT_SET_QAM_ACQUIRE      0xFF010108
#define OID_FLINT_SET_UP_FREQ          0xFF010106
#define OID_FLINT_SET_UP_PWR           0xFF010107
#define OID_FLINT_WRITE_EEPROM         0xFF010109
#define OID_FLINT_EXIT                 0xFF01010A
#define OID_FLINT_RESET_D100           0xFF01010B
#define OID_FLINT_CHANGE_MAC_ADDR      0xFF01010C
#define OID_FLINT_CHANGE_MCA_LIST      0xFF01010D
/*---------------------------------------------------
The 0xFF0201XX OIDs define the statistical oids where
some parameters of the hardware are fetched.
-----------------------------------------------------*/
#define OID_FLINT_IS_TUNER_LOCKED      0xFF020101
#define OID_FLINT_IS_DEMOD_LOCKED      0xFF020102
#define OID_FLINT_IS_FLINT             0xFF020103
#define OID_FLINT_GET_DOWN_STATUS      0xFF020104
#define OID_FLINT_GET_FEC_STATUS       0xFF020105
#define OID_FLINT_GET_DEMOD_STATUS     0xFF020106
#define OID_FLINT_GET_DEMOD_TAP        0xFF020107
#define OID_FLINT_GET_QAM_MODE         0xFF020108
#define OID_FLINT_GET_SNR              0xFF020109
#define OID_FLINT_GET_RAW_SNR          0xFF02010A
#define OID_FLINT_GET_AGC              0xFF02010B
#define OID_FLINT_GET_SYMBOL_RATE      0xFF02010C
#define OID_FLINT_GET_CCSL_VERSION     0xFF02010D
#define OID_FLINT_GET_LAST_ERROR       0xFF02010E
#define OID_FLINT_READ_EEPROM          0xFF02010F
#define OID_FLINT_GET_PACKETS_RCVD     0xFF020110
#define OID_FLINT_GET_CORRECTABLE_ERRORS    0xFF020111
#define OID_FLINT_GET_UNCORRECTABLE_ERRORS  0xFF020112
#define OID_FLINT_GET_DRIVER_VERSION   0xFF020113
#define OID_FLINT_GET_HW_INFO          0xFF020114
```

APPENDIX B

Cable Service Library API Calls

```
extern BOOL ccslClientInitAll(
               IN OUT         CCSLIF          *pCcslif);
/* set the tuner to a specific frequency */
/* obsolete tuning function, use SetFineTune() instead */
extern BOOL ccslClientSetTunerFreq(
               IN OUT         CCSLIF          *pCcslif,
               IN             DWORD           dChannel);
/* set tuner to specific frequency and include fine tuning */
extern BOOL ccslClientSetFineTune(
       IN OUT          CCSLIF          *pCcslif,
       IN              DWORD           dFreqInHz,       /* channel frequency
in HZ */
       IN              SWORD           wFreqOffset,     /* offset in steps
of 125 Khz for PLL#2 only, for frequency offset problems*/
       IN              SWORD           wIntSpurOffset,  /* offset in steps
of 125 khz for both PLLS, for internal spur/noise problems */
       IN              SWORD           wExtSpurOffset); /* offset in steps
of 1 Mhz for both PLLs, for external spur/noise problems */
/* setup the broadcom and try to acquire only once, enable
receiver */
extern BOOL ccslClientInitializeDemod(
               IN OUT         CCSLIF          *pCcslif );
/* setup the entire upstream into transmit mode using values in
pCcslif */
/* not implemented in HW, so function has no effect */
```

APPENDIX B-continued

Cable Service Library API Calls

```
extern BOOL ccslClientInitializeUp(
                        IN OUT          CCSLIF          *pCcslif );
/* set the frequency of the upstream channel */
/* not implemented in HW, so function has no effect */
extern BOOL ccslClientSetUpFreq(
                        IN OUT          CCSLIF          *pCcslif,
                        IN              DWORD           dFreq,
                        IN              DWORD           dBandwidth);
/* set the power of the upstream signal */
/* not implemented in HW, so function has no effect */
extern BOOL ccslClientSetUpPower(
                        IN OUT          CCSLIF          *pCcslif,
                        IN              SBYTE           cPowerLevel );
/* does sw reset, sets bIsInitialized = FALSE */
extern BOOL ccslClientExit(
                        IN OUT          CCSLIF          *pCcslif);
/* reacquire on the downstream signal */
extern BOOL ccslClientQamAcquire(
                        IN OUT          CCSLIF          *pCcslif);
/* enables the receiver input to the 82557 */
extern BOOL ccslClientEnableReceiver
                        IN OUT          CCSLIF          *pCcslif);
/* disables the receiver input to the 82557 */
extern BOOL ccslClientDisableReceiver(
                        IN OUT          CCSLIF          *pCcslif);
/***** status functions ****/
/* returns the current derotator values from the broadcom */
extern BOOL ccslClientGetDerotator(
                                IN OUT          CCSLIF          *pCcslif,
                                OUT             WORD            *pDrIntegrator,
                                OUT             WORD            *pDrFilter);
/* update pCcslif with the hardware config info read from flash */
extern BOOL ccslClientGetHardwareConfig
                                IN OUT CCSLIF                   *pCcslif);
/* return some useful version info so you can tell what ccsl.lib
you are using */
extern BOOL ccslClientGetCcslVersion
                        IN              CCSLIF          *pCcslif,
                        OUT             CCSLVERSION     *pCcslVersion);
/* returns a structure full of broadcom FFE and DFE values */
extern BOOL ccslClientGetDemodTapStatus(
                        IN OUT          CCSLIF                  *pCcslif,
                        OUT             DEMODTAPSTATUS          *pDemodTapStatus);
/* returns SUCCESS if the tuner 'fold' bit is high, tuner is
locked */
extern BOOL ccslClientIsTunerLocked(
                                IN OUT          CCSLIF          *pCcslif,
                                OUT             BOOL            *pIsLocked);
/* returns the lock status and error counts of the FEC */
extern BOOL ccslClientGetFecStatus(
                                IN OUT          CCSLIF          *pCcslif,
                                OUT             FECSTATUS       *pFecStatus);
/* get the uncorrectable errors */
extern BOOL ccslClientGetUncorrectErrors
                                IN OUT          CCSLIF          *pCcslif,
                                OUT             WORD            *pUncorrectCount);
/* get the correctable errors */
extern BOOL ccslClientGetCorrectErrors(
                                IN OUT          CCSLIF          *pCcslif,
                                OUT             DWORD           *pCorrectCount);
/* returns SUCCESS if the broadcom is FEC locked onto the incoming
data */
extern BOOL ccslClientIsDemodLocked(
                                IN OUT          CCSLIF          *pCcslif,
                                OUT             BOOL            *pIsLocked);
/* returns snr, qammode, agc and other status from the broadcom */
extern BOOL ccslClientGetDemodStatus(
                                IN OUT          CCSLIF          *pCcslif,
                                OUT             DEMODSTATUS     *pDemodStatus);
/* returns the entire downstream status which is gobs of data
mostly from the broadcom */
extern BOOL ccslClientGetDownStatus (
                                IN              CCSLIF          *pCcslif,
                                OUT             DOWNSTATUS      *pDownStatus);
/* returns SUCCESS if the card is verified to be a FLINT card */
/* and also sets IsFlint = TRUE */
extern BOOL ccslClientIsFlint(IN OUT CCSLIF *pCcslif,
```

APPENDIX B-continued

Cable Service Library API Calls

```
                                                     OUT BOOL              *pIsFlint);
/* returns the current QAM mode of the broadcom */
extern BOOL ccslClientGetQamModeStatus(
                        IN OUT          CCSLIF                  *pCcslif,
                        OUT             WORD                    *pQamMode);
/* returns the current symbol rate of the broadcom */
/* application must multiply *pSym by 0.015258789 to get symbol
rate in HZ */
extern BOOL ccslClientGetSymbolRateStatus(
                        IN OUT          CCSLIF                  *pCcslif,
                        OUT             DWORD                   *pSym);
/* returns the SNR value in dB from the broadcom */
extern BOOL ccslClientGetSnrStatus(
                        IN OUT          CCSLIF                  *pCcslif,
                        CUT             WORD                    *pSnr);
/* returns the SNR register value in hex from the broadcom,
provides greater resolution */
/* to covert to dB SNR use: SNR = 77.488 - 20 * log10(pSnr)
*/
extern BOOL ccslClientGetSnrRegStatus(
                        IN OUT          CCSLIF                  *pCcslif,
                        OUT             WORD                    *pSnr) ;
/* returns the AGC values from the broadcom in hundreths of volts
*/
extern BOOL ccslClientGetAgcStatus(
                        IN OUT          CCSLIF                  *pCcslif,
                        OUT             SWORD                   *pAgc);
/* returns TRUE if the receiver input to the 82557 is enabled */
extern BOOL ccslClientIsReceiverEnabled(
                        IN OUT          CCSLIF          *pCcslif,
                        OUT             BOOL            *pIsEnabled);
/* returns pIsLocked = LOCKED if Broadcom is SNR (QAM) locked */
extern BOOL ccslClientIsSnrLocked(
                                IN OUT          CCSLIF          *pCcslif,
                                OUT             BOOL            *pIsLocked);
/***** debug functions *****/
/* reset the RF circuitry on the Flint */
extern BOOL ccslReset(
                                IN OUT          CCSLIF          *pCcslif);
/* reset the 557 and the RF circuitry */
extern BOOL ccslReset557(
                                IN OUT          CCSLIF          *pCcslif);
/* raise the EECS lead on the 557 */
extern BOOL ccslRaiseEECS(
                                IN OUT          CCSLIF          *pCcslif);
/* lower the EECS lead on the 557 */
extern BOOL ccslLowerEECS(
                                IN OUT          CCSLIF          *pCcslif);
/* send a serial data stream out to the serial mux */
extern BOOL ccslShiftOutBits(
                                IN OUT          CCSLIF          *pCcslif,
                                IN              BYTE            cData,
                                IN              BYTE            cCount);
/* enable the flash accesses */
extern BOOL ccslClientEnableFlash(
                                IN OUT          CCSLIF          *pCcslif);
/* read a register value from the broadcom */
extern BOOL ccslQamRead(
                                IN OUT          CCSLIF          *pCcslif,
                                IN              BYTE            cAccess,
                                IN              BYTE            cRegAddr,
                                OUT             WORD            *pVal1,
                                OUT             WORD            *pVal2);
/* write a value to a broadcom register */
extern BOOL ccslQamWrite(
                                IN OUT          CCSLIF          *pCcslif,
                                IN              BYTE            cAccess,
                                IN              BYTE            cRegAddr,
                                IN              WORD            wVal1,
                                IN              WORD            wVal2);
#ifdef DOS /* for now, these functs are only DOS compatible */
/*ISSUE do we need to construct macros to make them NT compatible
*/
/* read a flash space register value */
extern BOOL ccslClientReadReg(
                                IN OUT          CCSLIF          *pCcslif,
                                IN              BYTE            cOffset,
```

APPENDIX B-continued

Cable Service Library API Calls

```
                                      OUT           BYTE              *pDataByte);
/* write a flash space register value */
extern BOOL ccslClientWriteReg(
                                      IN OUT        CCSLIF            *pCcslif,
                                      IN            BYTE              cOffset,
                                      IN            BYTE              *pDataByte);
/* point the mux to a specific serail device: broadcom, eeprom,
tuner or unused */
extern BOOL ccslClientSerialSelect(
                                      IN OUT        CCSLIF            *pCcslif,
                                      IN            BYTE              cDevice);
/* initialize the broadcom using the script file name parameter */
extern BOOL ccslInitDemodScript(
                                      IN OUT        CCSLIF            *pCcslif,
                                      IN            SBYTE             *pFileName);
extern BOOL ccslClientGetDemodStatusDebug(
                                      IN OUT        CCSLIF            *pCcSlif,
                                      OUT           DEMODSTATUS       *pDemodStatus,
                                      IN            WORD              wFuncDelay);
extern BOOL ccslClientGetFecStatusDebug
                                      IN OUT        CCSLIF            *pCCSlif,
                                      OUT           FECSTATUS         *pFecStatus,
                                      IN            WORD              wFuncDelay);
/* for printout of the SetFineTune() variables and output for all
channels, run this function */
extern BOOL ccslClientTestFineTune(
                                      IN OUT        CCSLIF            *pCcslif,
                                      IN            DWORD             dFreqInHz,
                                      IN            SWORD             wFreqOffset,
                                      IN            SWORD             wIntSpurOffset,
                                      IN            SWORD             wExtSpurOffset);
/* turns off the tuner */
extern BOOL ccslClientDisableTuner(
                                      IN OUT        CCSLIF            *pCcslif);
/* allows bit level programming of tuner to any desired frequency
setting */
extern BOOL ccslClientSetTunerDebug(
                                      IN OUT        CCSLIF            *pCcslif,
                                      IN            BOOL              current_high,
                                      IN            BYTE              a1,
                                      IN            BYTE              bh1,
                                      IN            BYTE              bl1
                                      IN            BYTE              rh1,
                                      IN            BYTE              rl1,
                                      IN            BYTE              a2,
                                      IN            BYTE              bh2,
                                      IN            BYTE              bl2,
                                      IN            BYTE              rh2,
                                      IN            BYTE              rl2);
```

What is claimed is:

1. An apparatus comprising:

a client machine having a first device capable of receiving downstream data transmitted from a server to the client machine, a second device capable of transmitting upstream data from the client machine to the server, wherein the second device has a smaller bandwidth to the first device, a first interface having a device driver for interfacing with the first device, and a second interface having (1) an input/output control interface to interface with the first interface and (2) a control and parse engine capable of receiving commands from a user regarding the first device, the control and parse engine to cause the first and second devices to establish a multi-horned connection with the server including selectively establishing upstream communication with the server via the second device when the downstream data does not contain a command and communicating with the first device to respond to the command when the downstream data contains the command.

2. The apparatus of claim 1, wherein the client machine further comprises:

a graphical user interface coupled with the control and parse engine which allows the user to interact with the device driver and allows the user to set device driver parameters.

3. The apparatus of claim 1, wherein the first device is a cable modem and the device driver is a cable modem driver.

4. The apparatus of claim 1, wherein the second device is an analog modem.

5. The apparatus of claim 1, wherein said device driver further comprises:

a set of object attributes identifiers; and, a set of application programming interfaces.

6. The apparatus of claim 1, wherein:

the control and parse engine uses the input and output control interface to communicate with the device driver when communicating with the first device.

7. The apparatus of claim 1, wherein the second device is coupled to an analog modem driver.

8. An apparatus comprising:

a client machine having a processor;

a first device capable of receiving downstream data transmitted from a server to the client machine, the first device having a device driver coupled thereto to provide control and data interfaces;

a second device capable of transmitting upstream data from the client machine to the server, wherein the second device has a smaller bandwidth an the first device;

a control and parse engine to communicate with the first device via an input and output control interface that allows for communication with the device driver; and a memory coupled to the processor and having instructions which, when executed, cause the processor to (1) establish a socket connection with the first device, (2) receive a plurality of data packets from the first device and a user of the client machine, and (3) determine via tile control and parse engine if each of the data packets contains a command, wherein if a current data packet contains a command, then communicating with the first device to respond to the command, and if the current data packet does not contain a command, then communicating with the second device to initiate an upstream connection.

9. The apparatus of claim 8, wherein the second device is an analog modem.

10. The apparatus of claim 8, wherein the first device is a cable modem.

11. The apparatus of claim 8, wherein said socket connection has an associated port number.

12. The apparatus of claim 8, wherein communicating with the first device comprises:

determining the command contained in the current data packet;

determining an associated object attribute identifier for the command; and issuing the associated object attributes identifier to a device driver for the first device.

13. The apparatus of claim 8, wherein the second device is coupled to an analog modem driver.

14. A method comprising:

establishing a downstream connection from a first device to a server and an upstream connection from a second device to the server, the first device and the second device included in a client machine, wherein the first device includes a control and parse engine to manage configuration of the downstream connection based on at least one command packet received from the server and a user of the client;

receiving downstream data transmitted from the server to the client machine via the first device;

determining if the downstream data includes a data packet that contains a command;

communicating with the first device to respond to the command if the data packet contains a command;

communicating with the second device to initiate an upstream connection if the data packet does not contain a command; and transmitting upstream data to the server via the second device, wherein the second device has a smaller bandwidth than the first device, and wherein communication with the server via the second device is established through the control and parse engine responsive to data received from the server via the first device.

15. The method of claim 14, wherein communicating with the first device comprises:

determining the command contained in the data packet;

determining an associated object attribute identifier for the command; and issuing the associated object attributes identifier to a device driver for the first device.

16. The method of claim 14, wherein the first device is a cable modem.

17. The method of claim 14, wherein:

the control and parse engine uses an input and output control interface to communicate with a device driver for the first device.

18. The method of claim 14, wherein the connection has an associated port number.

19. An article comprising a machine readable medium having instructions stored thereon which when executed by a processor cause the processor to perform operations comprising:

coupling a first interface with a second interface, the first interface having a device driver for interfacing with a first device, the second interface having a control and parse engine and an input/output control interface for interfacing with the first interface, wherein the control and parse engine is capable of (1) causing the first device and a second device to establish a connection with a server, (2) responding to messages from the server, and (3) receiving commands from a user regarding the first device;

establishing connections from the fist device to the server and from the second device to the server, the first device and the second device included in a client machine;

receiving downstream data transmitted from the server to the client machine via the first device;

determining if the downstream data includes a data packet that contains a command;

communicating with the first device to respond to the command if the data packet contains a command;

communicating with the second device to initiate an upstream connection if the data packet does not contain a command; and transmitting upstream data from the client machine to the server via the second device, wherein the second device has a smaller bandwidth than the first device.

20. An article according to claim 19, wherein communicating via the control and parse engine with the first device comprises:

determining the command contained in the data packet;

determining an associated object attribute identifier for the command; and issuing the associated object attributes identifier to a device driver for the first device.

21. An article according to claim 19, wherein the first device is a cable modem.

22. An article according to claim 19, wherein the second device is an analog modem.

23. An article according to claim 19, wherein the socket connection has an associated port number.

* * * * *

UNITED STATES PATENT AND TRADEMARK OFFICE
CERTIFICATE OF CORRECTION

PATENT NO.    : 6,421,728 B1
DATED         : July 16, 2002
INVENTOR(S)   : Mohammed et al.

It is certified that error appears in the above-identified patent and that said Letters Patent is hereby corrected as shown below:

<u>Column 5,</u>
Line 48, delete "6", insert -- 60 --.

Signed and Sealed this

Fourteenth Day of January, 2003

JAMES E. ROGAN
*Director of the United States Patent and Trademark Office*